United States Patent

[11] 3,554,087

| [72] | Inventor | Peter Florjancic<br>Sankt Martin - Str. 12, Garmisch-<br>Partenkirchen, Germany |
|---|---|---|
| [21] | Appl. No. | 701,168 |
| [22] | Filed | Jan. 29, 1968 |
| [45] | Patented | Jan. 12, 1971 |
| [32] | Priority | Feb. 13, 1967 |
| [33] | | Austria |
| [31] | | No. A1341/67 |

[54] HYDRAULIC CLOSING DEVICE PARTICULARLY FOR INJECTION MOLDING MACHINES
6 Claims, 8 Drawing Figs.

[52] U.S. Cl. .................................................. 91/404,
91/394, 91/416, 91/422, 18/30
[51] Int. Cl. .................................................... F15b 13/04,
F15b 15/17, F15b 15/22
[50] Field of Search ........................................ 91/416,
31(Cursory), 422, 392; 91/404; 18/30(Cursory)

[56] References Cited
UNITED STATES PATENTS

| 2,805,447 | 9/1957 | Voges .......................... | 91/404 |
| 2,505,786 | 5/1950 | Mork ........................... | 91/416 |
| 2,855,752 | 10/1958 | Brusque ...................... | 91/31 |

*Primary Examiner*—Paul E. Maslousky
*Attorney*—Fleit, Gipple & Jacobsen

ABSTRACT: A hydraulic apparatus for sequentially moving a member by a small force and for forcing said member against a stop by a large force comprises pumps and hydraulic pistons which are mechanically connected to said member. A working piston and a compensating piston which is smaller in cross section than the working piston are mechanically connected to one another and to the member which is to be moved. The associated cylinder chambers are hydraulically connected by an opening, which is adapted to be closed. The cylinder chamber containing the compensating piston communicates through an outlet, which is preferably adapted to be closed, with a chamber in which a pressure exists which is lower than the working pressure.

PATENTED JAN 12 1971  3,554,087

HYDRAULIC CLOSING DEVICE PARTICULARLY FOR INJECTION MOLDING MACHINES

This invention relates to an apparatus for a preferably rectilinear movement of a member, which performs first a relatively long displacement at a speed which is as high as possible and against a small resistance until it reaches an end position, whereafter it exerts a large pressure force against a fixed abutment. These requirements are to be met, e.g., by the movable platen of an injection molding machine as well as in presses, punching machines etc.

A hydraulic drive is generally used for this purpose because it enables a convenient control of the velocity and pressure. The movable platen is connected to a piston, to which liquid pressure is applied. To produce the very large retaining forces which are required, the working pressure of the liquid as well as the piston area must be large because each of these parameters cannot be increased indefinitely. The large piston area involves a high oil flow rate, which cannot be supplied by a normal high-pressure pump.

Known hydraulic systems for the operation of movable platens comprise a high-capacity low-pressure pump for the closing movement and a high-pressure pump for producing the strong retaining force. An important disadvantage of this system is the high cost of the two pumps and the changeover valve which is required. Whereas automatically controlled pumps are known, which operate at a lower capacity against increasing back pressure so that the driving power remains approximately constant, the automatic control system complicates the design of the pump and the dual function requires compromises in design. Besides, the injection mold may be damaged because the pump produces the high pressure independently of the reaching of the intended closed position.

It is particularly undesirable that the connecting conduits between the pump system and the closing cylinder must be designed for the high oil flow rate and must also resist the high pressure applied to the movable platen. The use of separate high- and low-pressure conduits renders the plant more complicated and more liable to be deranged.

The same disadvantages are inherent in a different system, in which separate high-pressure and low-pressure pistons act on the movable platen in succession. In this case two pumps and/or complicated changeover valves are also required and the oil at the high flow rate required for the high-pressure cylinder must be moved for each stroke from the cylinder into a supply cylinder and back. The pipelines required for this purpose must also handle a large oil flow rate. Unless a separate conduit is provided for transmitting the pressure from the pump to the high-pressure cylinder, these large pipelines must resist also high pressure. Besides, two cylinders with pistons, seals, etc., are required.

Closing devices are known in which the high-pressure piston is not directly connected to the movable platen but is mechanically connected to the movable platen but is mechanically connected thereto only when the closing movement has been completed. In this case, the oil flow rates are low but two pumps, two cylinders and a coupling mechanism are required. As a result, the time required for the closing operation is increased and the coupling mechanism is expensive and subjected to heavy wear because strong forces are involved.

The closing apparatus according to the invention avoids the above-mentioned disadvantages and enables a fast closing movement and a high retaining pressure to be obtained with only one pump, which is not automatically controlled, while only small oil flow rates must be handled by the transfer conduit between the pump and cylinder. This is accomplished in that a working piston and a compensating piston which is smaller in cross section than the working piston are mechanically connected to one another and to the movable platen, the associated cylinder chambers are hydraulically connected by an opening, which is adapted to be closed, and the cylinder chamber which contains the compensating piston is connected by an outlet, which is preferably adapted to be closed, to a chamber in which a pressure prevails which is lower than the working pressure.

The hydraulic apparatus according to the invention for moving a member by a small force and for forcing said member against a stop by a large force, which apparatus comprises pumps and hydraulic pistons which are mechanically connected to said member, is characterized in that a working piston and a compensating piston which is smaller in cross section than the working piston are mechanically connected to one another and to the member 8 which is to be moved, the associated cylinder chambers 6, 7 are hydraulically connected by an opening 22, 22', 22'', which is adapted to be closed, and the cylinder chamber 7 containing the compensating piston communicates through an outlet 18, which is preferably adapted to be closed, with a chamber in which a pressure exists which is lower than the working pressure.

The apparatus according to the invention is further characterized in that the working piston and compensating piston are formed by a single, double-acting piston member 5 and the effective cross section at one end of the piston member is reduced by the elements 9 connecting it to the member 8 which is to be moved.

The apparatus according to the invention is further characterized in that the opening 22 which is adapted to be closed and connects the two cylinder chambers is formed in the piston member 5.

Furthermore, the apparatus according to the invention is characterized in that the valve member 23, 23' for closing the opening 22 between the two cylinder chambers 6, 7 is operatively connected to the member 8 to be moved.

Finally, the apparatus according to the invention is characterized in that the valve member is formed by a preferably slidable cylinder liner 29.

The apparatus according to the invention is also characterized in that the valve member 23, 5, 23'' has a progressively decreasing cross section of flow.

The apparatus according to the invention is additionally characterized in that the outlet 18 of the compensating cylinder chamber 7 is closed by a conventional magnetic valve 19.

The apparatus according to the invention is also characterized in that the outlet 22 of the compensating cylinder chamber 7 is closed by a relief valve.

Figure 1:
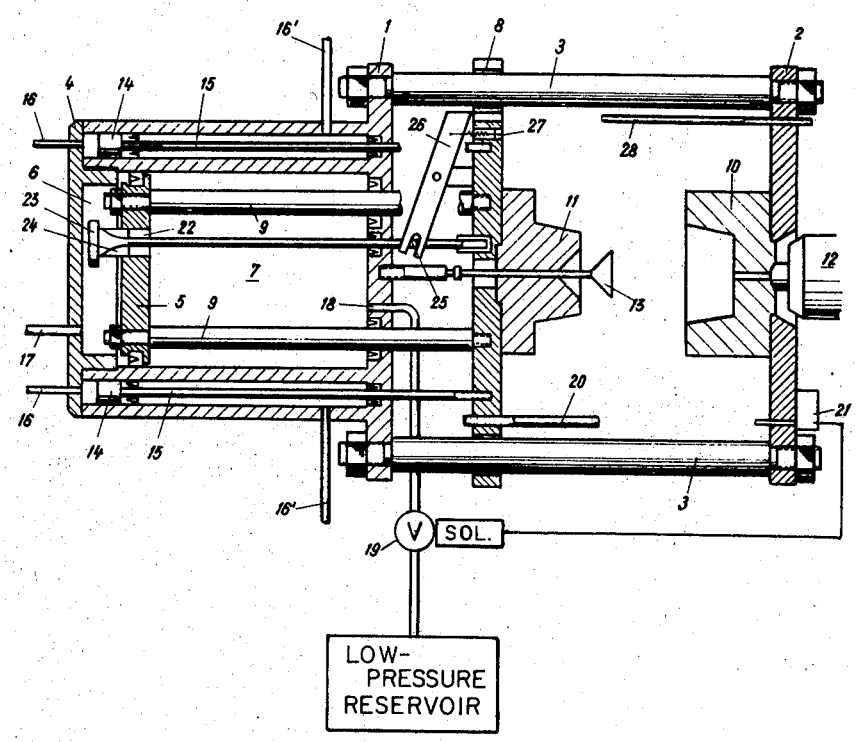
FIG. 1 is a diagrammatic sectional view showing the movable platen assembly of an injection molding machine with the mold in open position.
Figure 2A:
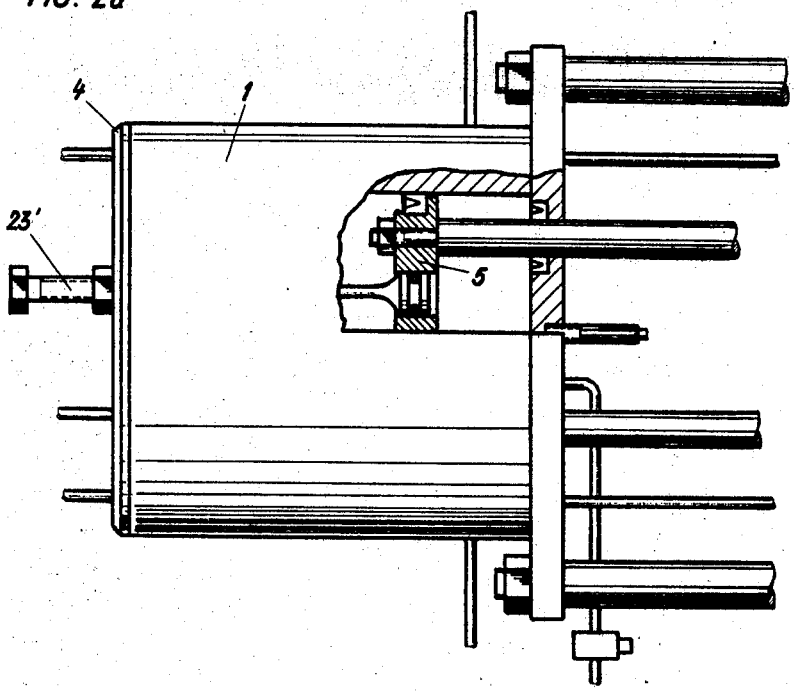
FIG. 2a shows the movable platen assembly of FIG. 1a in closed position.
Figure 2:
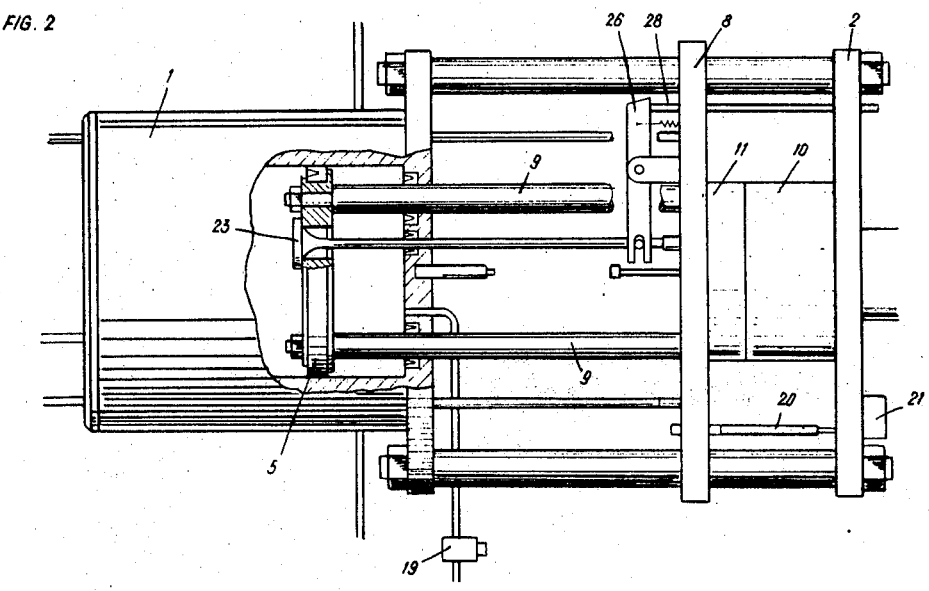
FIG. 2 shows the movable platen assembly of FIG. 1 in closed position.

FIGS. 1 and 2 show a cylinder body 1, which is connected by studs 3 to the mounting platen 2 and closed by the cover 4. A double-acting piston member 5 divides the main cylinder into a working cylinder chamber 6 and a compensating cylinder chamber 7 and is connected by push rods 9 to the movable platen 8.

The two parts 10 and 11 of an injection mold are mounted in the mounting platen 2 and the movable platen 8, respectively. The drawing shows also a nozzle head 12 and an ejector 13.

In addition to the main cylinder, the cylinder body 1 comprises two additional cylinder chambers which are smaller in cross section and contain the retracting pistons 14, which are firmly connected to the movable platen 8 by piston rods 15.

The pump system is connected to these cylinder chambers by the pipes 16 and 16' and to the main cylinder by the fitting 17. Valve means, not shown, are connected between the pump system and the cylinder chambers.

Another connection extends from the compensating cylinder chamber 7 through an opening 18 and a magnetic valve 19 to the nonpressurized supply reservoir of the pump system.

The magnetic valve 19 is opened by the action of an adjustable actuating pin 20 and a limit switch 21 as soon as the mold is closed. The cross section of flow of the magnetic valve 19 may be small as the valve must handle only very small oil flow rates.

The piston member 5 has a bore 22, in which a stem of a valve 23 is mounted. The valve poppet is disposed in the working cylinder chamber 6. The stem is formed with milled longitudinal grooves 24, which continuously decrease in depth to zero toward the valve poppet. An extension of the valve stem extends through the compensating cylinder chamber 7 and the bottom of the cylinder body 1 and carries a cross pin 25, which is engaged by a rocker lever, which is mounted on the movable platen. A spring 27 tends to hold the valve 23 in its open condition.

When the mold approaches its closed position, an adjustable actuating pin 28 causes the valve 23 to be drawn to its closed position by the rocker lever 26.

The apparatus has the following mode of operation: As soon as the working piston moves under the action of liquid pressure applied to it, the liquid in the compensating cylinder chamber is displaced. At the beginning of the movement, the connection between the two cylinders is maintained so that the liquid can flow through said connection into the working cylinder chamber. As a result, the pump need not supply the entire amount of oil required to fill the working cylinder chamber but only the differential amount which corresponds to the difference between the cross sections of the pistons. When the desired end position has been reached, in which the high contact pressure is to be applied, the connection between the two cylinders is interrupted and the compensating cylinder chamber is reliably pressure relieved through the outlet of the compensating cylinder chamber. The working piston is now subjected only to the full pump pressure so that the desired large retaining force is produced.

The desired sequence of fast movement and large force is thus obtained without need for moving large amounts of liquid between the closing apparatus and the supply reservoir.

For this reason, conduits, valves etc. may be provided which have small cross sections. In view of the high pressures involved, this feature greatly facilitates the design and results in a great saving of material.

A particularly simple and compact design will be obtained if the two pistons are formed by a single piston member, which is double acting, and the effective cross-sectional area at one end of the piston member is reduced by the elements for connection to the movable platen. In this case, the hydraulic connection between the two cylinder chambers may be provided in the piston member or in the cylinder body or may be formed by an annular clearance between the piston member and the cylinder.

Figure 5:
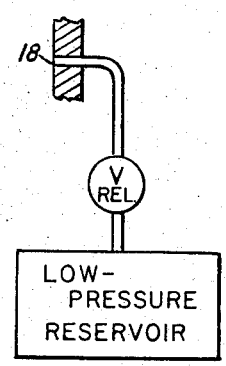
FIGS. 5 and 6 show alternate valves for replacing the magnetic valve illustrated in FIG. 1.
Figure 6:
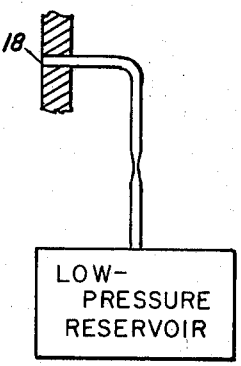

As the retaining movement is only very short and the pressure in the compensating cylinder chamber is not very high even during the closing movement, the outlet of the compensating cylinder chamber may be very small in cross section and need not contain a valve so that it forms only a constriction (see FIG. 6). Only a small amount of liquid is lost through such outlet during the closing movement. On the other hand, the design is further simplified. Said liquid loss can be entirely prevented if a relief valve is provided (see FIG. 5).

Another advantage of the closing apparatus according to the invention resides in the fact that there is sufficient space for the means for operating the ejector behind the movable platen, contrary to known closing devices.

Further features of the invention will become apparent from the following description of an illustrative embodiment. The invention is not restricted to this design and the reference numbers in the claims serve only to facilitate the understanding.

It is assumed that the elements are initially in the position shown in FIG. 1. Liquid under pressure is supplied through the fitting 17 into the working cylinder chamber 6. Owing to the communication established by the bore 22, the same pressure prevails in the compensating cylinder chamber 7 and in the working cylinder chamber 6. The effective cross-sectional area of the piston in chamber 6 is smaller by the cross section of the piston rods 9 so that a resultant force in the closing direction is exerted on the piston member 5. By the movement of the piston member 5, oil from the compensating cylinder chamber 7 is displaced through the bore 22 into the working cylinder chamber 6 so that the same will be entirely filled if the amount of liquid is added which corresponds to the cross section of the piston rods 9.

When the mold approaches its closed position, the actuating pin 28 causes the valve 23 to be pulled to its closed position by the rocker lever 26. As the movement proceeds, the cross section of flow is continuously decreased by the milled grooves. The resistance which is presented causes the piston movement to slow down so that the closing of the mold halves is damped. The valve 23 is closed when the mold has reached its closed position.

The pin 20 actuates at the same time the limit switch 21, which opens the valve 19 so that the compensating cylinder chamber 7 is connected to the supply reservoir. The full no-load pressure of the pump acts now unilaterally on the piston member from the working cylinder chamber and the mold is retained with a large force in its closed position, shown in FIG. 2.

The mold cannot be entirely closed when foreign matter is clamped between the mold halves because the small piston force which is effective before the pressure relief of the compensating cylinder chamber 7 is not sufficient to crush such foreign matter. As the limit switch 21 is not actuated to pressure relieve the compensating cylinder chamber 7, the mold halves cannot be damaged. When this safety feature is not required, the magnetic valve 10 may be replaced by a simple relief valve or only by a constriction so that the design is much simplified. These alternates are shown in FIGS. 5 and 6, respectively. In one case, oil will flow at a very low rate through the relief valve only in the last phase of the closing operation. In the second case, there is a loss of oil throughout the closing operation but this loss can be kept within tolerable limits because there is only a moderate pressure in the compensating cylinder chamber during that period of time.

To open the mold, the discharge conduit from the pump is separated from the fitting 17 and connected to the fittings 16' so that liquid under pressure is supplied to the retracting pistons 14. The movable platen 8 is thus moved away from the mounting platen 2 and the valve 23 is opened under the action of the spring 27. A large portion of the liquid in the working cylinder chamber 6 can now flow into the compensating cylinder chamber 7. Only a small portion is forced through the fitting 17 into the supply reservoir.

Figure 1A:
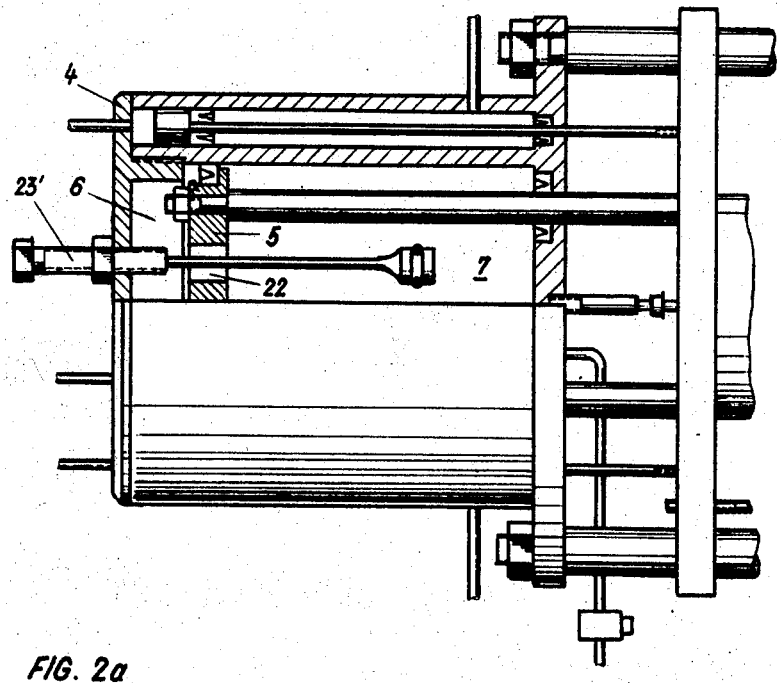
FIG. 1a shows a modified detail.
Figure 3:
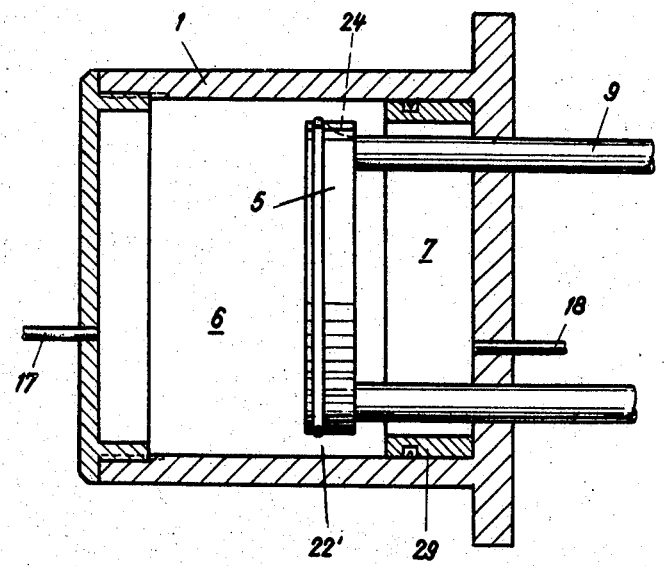
FIGS. 3 and 4 show modified embodiments of the invention.

As is diagrammatically shown in FIGS. 1a and 2a, the valve 23 may be formed by a rod 23', which is adjustably mounted in the cylinder cover 4 and cooperates with the bore 22 in the piston member 5. A modified embodiment is diagrammatically shown in FIG. 3. Like parts are designated with the same reference characters as in FIGS. 1 and 2. A longitudinally slidable cylinder liner 29 is mounted in the main cylinder and is adjusted in dependence on the height of the injection mold. The diameter of the piston member is equal to the inside diameter of the liner 29 so that an annular clearance 22' is left between the piston member 5 and the cylinder bore. The clearance 22' enables a transfer of liquid between the working cylinder chamber 6 and the compensating cylinder chamber 7. The milled grooves 24 having a decreasing cross section are formed in this embodiment in the piston member 5.

This embodiment has the same mode of operation as the apparatus shown in FIGS. 1 and 2.

Figure 4:
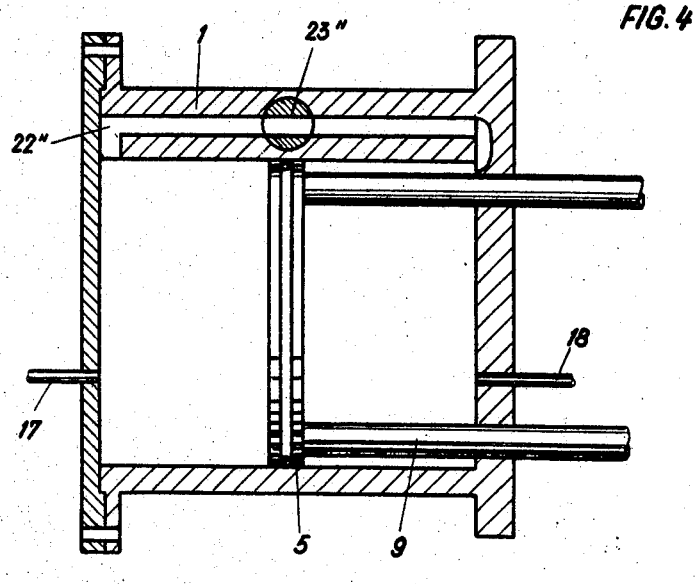

FIG. 4 shows another embodiment of the invention. The transfer passage 22" is formed in the cylinder body 1 and contains a plug valve 23", which is closed at the end of the closing movement by a part which is connected to the piston member, e.g., the movable platen, and a mechanism which is not shown. As the movement proceeds, the free cross section is continuously decreased so that the piston movement is damped.

The invention is not restricted to rectilinear movements but may also be applied to rotationally moved members.

I claim:

1. A hydraulic device for the successive moving of a part with a small force and urging this part against a stop with great force, the device comprising: a hydraulic piston; a movable part adapted to be urged against a stop; connecting elements mechanically joining said piston and said movable movable part; said piston having a working side remote from said stop and a compensation side adjacent said stop, the cross section of the working side being greater than the cross section of the compensation side by an amount equal to the cross section of said connection elements; a closable opening passing directly from the working side to the compensation side of the piston through which opening the working side of the piston and the compensating side hydraulically communicate; closure means responsive to the position of said movable part for effecting the closure of said closable opening when the movable part is urged against said stop; and a closable outlet associated with the compensation side of the piston, said outlet being in communication with a space, the pressure of which is lower than that on the working side of said piston.

2. The device of claim 1, wherein said closable opening is defined by a slidable cylinder liner communicating with the piston, the slidable liner being positioned on the compensation side of the piston.

3. The device of claim 1, wherein said closable opening is provided in the piston.

4. The device of claim 3, wherein the closure member has a progressively decreasing cross section of flow in the closable opening upon the closure of said opening.

5. The device of claim 1, wherein said closure member is closed in response to a lowering of the pressure on the compensation side of said piston.

6. The device of claim 1, wherein said closable outlet is adapted to be closed by a magnetic valve.